Sept. 16, 1958    P. F. H. G. F. GUIOCHON    2,851,821
PACKAGED CULTURES IN LOW CLASS ORGANISMS
SUCH AS MUSHROOM SPAWN Filed Jan. 17, 1955          2 Sheets-Sheet 1

P. F. H. G. F. GUIOCHON by *Sowsen P. Beama*

Attorney

Sept. 16, 1958   P. F. H. G. F. GUIOCHON   2,851,821
PACKAGED CULTURES IN LOW CLASS ORGANISMS
SUCH AS MUSHROOM SPAWN
Filed Jan. 17, 1955   2 Sheets-Sheet 2
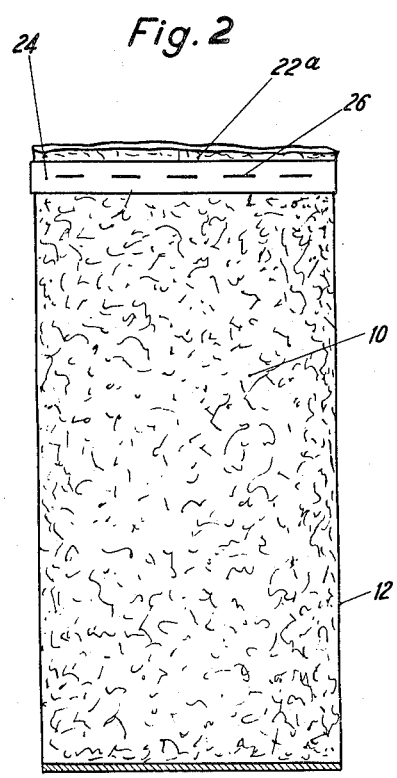
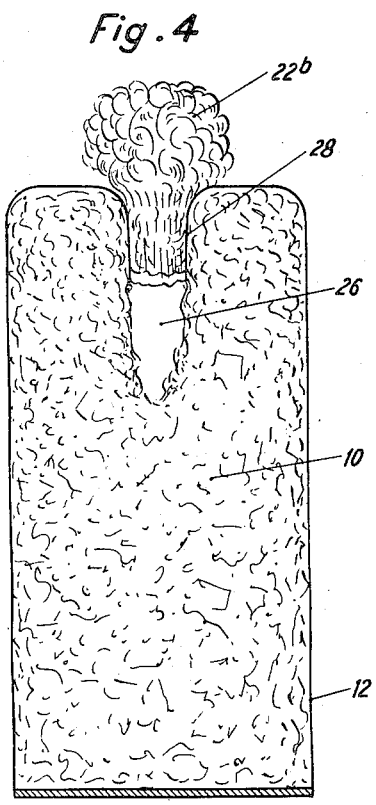
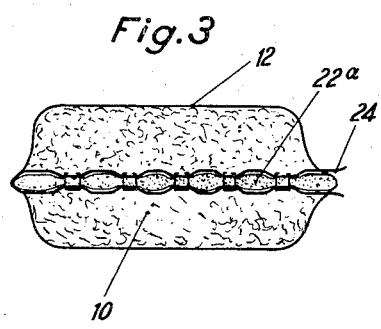
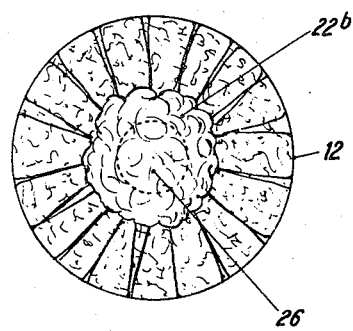
P. F. H. G. F. GUIOCHON
by *Townsend Townsend*
Attorney 2,851,821
PACKAGED CULTURES IN LOW CLASS ORGANISMS SUCH AS MUSHROOM SPAWN Pierre Frederic Henri Georges Felix Guiochon, Mesnil-le-Roy, France Application January 17, 1955, Serial No. 482,358

2 Claims. (Cl. 47—1.1)

Heretofore the industrial production of cultures of organisms such as tissues, algae, bacteria, fungi, mushroom mycelium or spawn or other low class organisms by the so-called "in vitro" method and in unit quantities ranging from a few cubic centimeters to a few cubic decimeters has generally been performed by inoculating various media which may be sterilized, pasteurized, Tyndallized or otherwise asepticized (such as for example by diathermy, ultra violet rays, electromagnetic radiations, electrical discharges or other known means) in glass tubes or flasks which may have any suitable shape.

Cultures prepared as above stated are available to users, such as mushroom growers, either in the tube or flask which was used for preparing the culture or apart from said tube or flask. In the latter case, such cultures are available either in bulk or accommodated in protecting and/or utilization containers to which they have been transferred from the original containers.

In most cases, however, much care is devoted to transferring organisms cultivated in such containers, only a limited guaranty of purity and freedom of contamination is achievable on account of the transfer operation which inevitably involves a risk of contamination.

An object of the present invention is to provide a new or improved process of producing and storing packaged cultures such as tissues, algae, bacteria and fungi mycelium or spawn avoiding the aforesaid disadvantages while doing away with the necessity of using glass containers as according to the prior art.

Another object of the invention is to provide a new or improved process as aforesaid wherein the packaged cultures are produced and stored in light transparent supple walled containers made of plastics.

A further object of the invention is to provide for carrying out the aforesaid new process and as a new article of manufacture a supple light and transparent container allowing the culture to be produced, stored and delivered in one and the same enclosure, thereby staving off the risk of contamination.

A still further object of the invention is to provide a packaged culture and particularly packaged mushroom spawn comprising a light transparent supple walled container partly filled with compost or substratum inoculated with the appropriate seed or inoculum, said inoculated compost or substratum being in incubated condition with the compost invaded with the culture ready for subsequent utilization.

Other objects and advantages of the invention will come out of the continuation of this disclosure.

In accordance with the present process, said organisms are cultivated in light supple walled containers made of a suitable plastic substance so selected as to withstand appropriate sterilization operations and to preserve a sufficient degree of transparency to permit the checking or supervising at any time of the degree of evolution of the cultures and the verification of absence of infection in the culture.

Various plastics may be used some of which are indicated hereafter by way of examples:

(1) In the chemical family of polycarbides pure polymers of polyvinylcarbazole having the formula

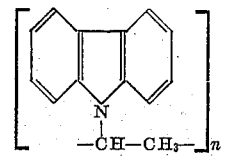

(2) In the chemical family of halogenated polycarbides chlorofluorated copolymers such as polytrifluorochloroethylene having the formula

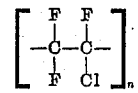

(3) Pure polymers of polyvinyl chloride forming supple sheets and having the formula

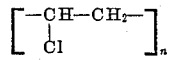

(4) Polymers of polyvinylidene chloride having the formula

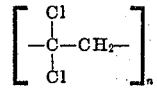

(5) In the chemical family of superpolyamides, certain plastics, for example those obtained by polymerization of amino-11-undecanoic acid having the formula $$CH_2NH_2—(CH_2)_9COOH$$

(6) Plastics having a polyurethane base having the formula $$[—O—(CH_2)_4—O—CO—NH—(CH_2)_6—NH—CO]_n$$

The above enumeration is not limitative of the possibilities of the invention but is given in support of the present disclosure.

According to a feature of the present process, the supple walled containers or plastic bags or sacks containing the culture medium are sealed by a suitable filtering material, for example by securing a cotton pad or stopper in the container mouth by means of a clasp or clamp or alternatively are fitted with a venting or aerating device whereafter they are subjected to sterilization. The bags or supple walled containers are then aseptically inoculated in accordance with the usual practice followed in bacteriological laboratories or through a hole drilled through the container wall. This hole may be afterwards sealed off by welding, soldering, cementing, coalescing or any other suitable method.

After a sufficient evolution of the cultures in the supple wall containers, the latter are withdrawn from the work rooms and may be sent to the users, for instance to mushroom growers in the case of mushroom spawn. As the containers are light and not brittle, the disadvantages experienced in the prior art with glass containers are avoided.

A primary advantage of cultures thus presented is that they may be subjected to any handling, conveying, transporting or other manipulations to the site of use e. g. to the mushroom growing bed, while remaining protected from exterior contaminations inasmuch as they remain in the same sealed supple walled bag or container in which their evolution took place.

The invention is also concerned as above stated with prefabricated supple walled containers or bags which may have any size and shape for use in carrying out the new method of cultivation of low class organisms according to the invention. Such containers may be for example similar to those commonly employed in microbiological laboratories or have shapes such as sacks, bags, tubes, hoses, casings, boxes or the like. Such containers have in principle a volume not exceeding a maximum of a few cubic decimeters.

The invention is further concerned with supple walled containers obtainable by wrapping or covering a substratum with a coating made of a plastic substance derived from sheets, films or foils or from said substance in the form of a dispersion, powder, gel, solution or like state.

In another embodiment of the invention viewed in another aspect, the coating may be formed by using the constituents or components of a plastic substance by a process of addition, substitution, condensation or polymerization. One or more of said components may be derived from the substratum itself.

An advantage of the process according to the invention is that it permits glass containers which are always fairly heavy, fragile, costly and cumbersome to be superseded by supple walled bags which while being lighter afford adequate protection to the interior cultures. These supple walled bags do not risk breakage as do glass articles and lend themselves to easy storing in a minimum space in small magazines or store rooms. They require neither washing nor piling up as do glass containers.

It will be seen from the foregoing that the present process permits all the steps of sterilizing, inoculating, evolution, controlling, displaying, packing and transporting right up to the site of emyployment (for instance a mushroom growing plant) of any cultures of low class organisms such as tissues, algae, bacteria, mushroom spawn to be carried out in the same supple walled light and transparent container comprising a plastic substance bag or hose.

For a better understanding of the invention, three examples will now be given and will be set forth with reference to the accompanying diagrammatic drawings forming a part of the present disclosure.

In the drawings:

Fig. 2 is a vertical sectional view of a second constructional form of a supple walled container or bag in which is likewise accommodated a compost or substratum.

Fig. 3 is a top plan view corresponding to Fig. 2.

Fig. 4 is a vertical sectional view of a third constructional form of a supple walled container or bag in which is likewise accommodated a compost or substratum.

Fig. 5 is a top plan view corresponding to Fig. 4.

*Example No. 1*

Figure 1:
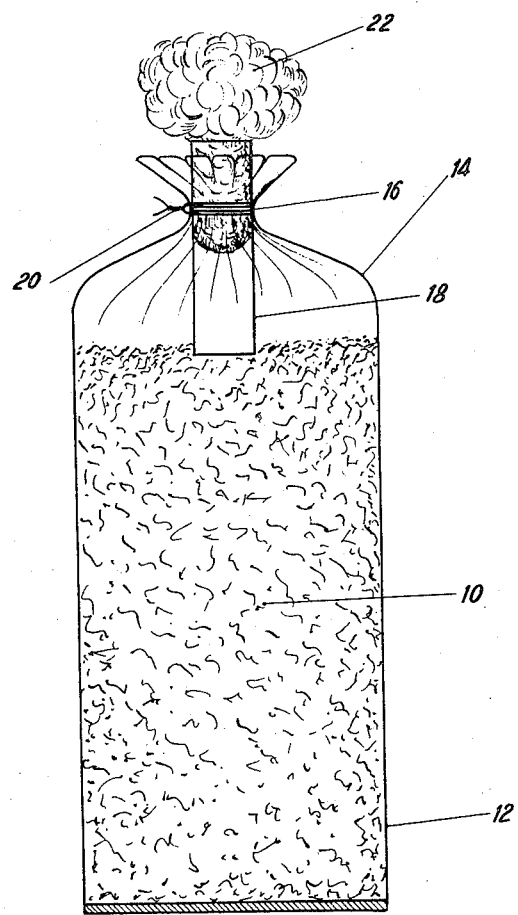
Fig. 1 is a vertical sectional view of a first constructional form of a supple walled container or bag in which is accommodated a compost or substratum.

A solid compost or substratum 10 prepared by known or conventional means for the culture of the organisms to be produced is introduced by any approved means into a transparent plastic bag 12 of which (as shown in Fig. 1) a sufficient edge portion 14 (say one quarter of the capacity of the bag) is kept free to enable it to be folded or crimped as shown at 16 and tightened about a tube 18 (made for example of metal foil such as aluminum foil or a suitable plastic), said tube having such a diameter as to permit the inoculation and the breathing of the inoculated compost or substratum.

The tube 18 may be inserted more or less deeply into the compost or substratum 10. It may or may not be provided with a flaring base end (not shown but obvious) and may be provided adjacent its upper projecting end with one or several grooves for receiving a supple tie such as a cord or string 20 suitably knotted or otherwise held fastened so as to provide a strong attachment of the plastic wall of the bag 12 to the tube 18. The plastic substance may be also welded or crimped to the tube wall. The tube 18 is afterwards sealed off by the usual means with the aid of a filtering material 22. This filtering material may be for example cotton-wool or a loose cellulose material capable of allowing air breathing through the vent or aerator thus provided. A bag prepared as above described may be sterilized, inoculated and allowed to incubate just as though the container were a glass tube or flask.

*Example No. 2*

The bag made of a plastic substance and designated by 12 (see Figs. 2 and 3) is filled as in the first example with a compost or substratum 10, and the bag edges are then brought flatly together with a strip of a filtering material 22a having a sufficient thickness for permitting the organisms which grow on the compost after the inoculation of the latter to breathe. In order to hold the bag edges against the filtering material 22a, these edges may be sewn, clasped or clamped together. For imparting proper strength to the closure thus performed, the clasping or sewing operation may be effected between a pair of plates or leaves 24 of thin sheet metal or foil such as aluminum. Sterilization is performed according to the customary procedure. Following the sterilization the inoculating operation is effected by moving apart the lips of the bag 12 between two clasps or stitches such as 26 i. e. to an extent just sufficient for permitting the inoculation. Contact between the edges of the bag 12 and the filtering material 22a is then re-established by a mere finger pressure or by means of a clamp or other tightener. The adjunction of a metal plate or leaf such as 24 facilitates this operation.

*Example No. 3*

With reference to Figs. 4 and 5, the bag 12 is filled as in Example No. 2 with a compost or substratum but an aperture 26 is provided centrally in the top of said substratum 10. The edge portions of the bag 12 are then brought back to the central portion thereof as shown at 28 and folded down inside the aperture 26 so as to build a venting or aerating hole which is afterwards stopped or sealed off by means of a plug of filtering material 22b which also preserves the aerator shape, keeps the bag edges in proper position, permits the organisms to breathe and finally allows of the insertion of the inoculating germs. Sterilization is effected according to the customary procedure.

It will be seen from the foregoing that the process includes the following steps:

(1) Partly filling a supple walled bag made of a plastic with the compost or substratum adapted to carry the culture during incubation;

(2) Closing the mouth of the bag around a vent or aerator (for example a tube of stiff material) and filling this vent or aerator with a plug or stopper of filtering material which constitutes a screen but allows breathing of the interior of the bag;

(3) Sterilizing the inside of the plastic bag by any conventional method e. g. by steam, by electromagnetic radiations, by Tyndallization, by the temporary passing of noxious gases which are afterwards eliminated by pure air or an inert gas;

(4) Inoculating the culture medium or compost contained in the plastic bag by inserting the inoculum which is necessary for the culture or development of the organisms through the venting or aerating aperture with the usual precautions to avoid contamination;

(5) Allowing the inoculated medium in the plastic bag to incubate for the required time which, when dealing with mushroom spawn, may represent several weeks until the organism e. g. fungi mycelium has completely invaded the compost.

(6) Transporting the bag, once the incubation is completed, to the site of use without touching the culture i. e. while keeping the same protected from contamination.

The details of the process may be modified without departing from the scope of the subjoined claims.

What is claimed is:

1. As a new article of manufacture, packaged pure cultures comprising an elongated bag-like container made of transparent flexible plastic, a compost mass partly filling said container, said compost having been sterilized, inoculated and incubated within the container, a chimney provided by a recess defined by said compost mass adjacent one end of said container and lined by an inwardly folded portion of said bag-like container, and a filter material in said chimney through which the culture is able to breathe and by which it is protected from external contamination.

2. As a new article of manufacture, packaged pure cultures comprising a bag-like container made of transparent flexible plastic, a compost mass partly filling said container to define a flat end with a recess therein formed by said mass, said compost having been sterilized, inoculated and incubated within the container, a closure provided by the non-filled portions of the container, brought flatly radially inward over said end and axially downward to line said recess and an aerator made of filter material located within said lined recess of said container through which the culture is able to breathe, while being protected from external contamination.

References Cited in the file of this patent

UNITED STATES PATENTS

| | | |
|---|---|---|
| 1,137,388 | Earp-Thomas | Apr. 27, 1915 |
| 1,389,659 | Hollowood | Sept. 6, 1921 |
| 1,914,353 | Rettew | June 13, 1933 |
| 2,044,861 | Sinden | June 23, 1936 |
| 2,452,174 | Arnold | Oct. 26, 1948 |
| 2,677,646 | Lovell | May 4, 1954 |

FOREIGN PATENTS

| | | |
|---|---|---|
| 909,848 | France | Jan. 10, 1946 |
| 1,087,584 | France | Aug. 25, 1954 |

OTHER REFERENCES

Modern Packaging, March 1949, page 127.
Modern Packaging, March 1951, page 109.
Modern Packaging, March 1954, page 10.